United States Patent

[11] 3,581,489

| [72] | Inventors | David L. Camin<br>Wilmington;<br>Robert E. Burtner, Wynnwood,<br>Wilmington, both of, Del. |
|---|---|---|
| [21] | Appl. No. | 784,352 |
| [22] | Filed | Dec. 17, 1968 |
| [45] | Patented | June 1, 1971 |
| [73] | Assignee | Sun Oil Company<br>Philadelphia, Pa. |

[54] APPARATUS FOR INDUCTIVE HEATING NONCONDUCTIVE EXHAUST TREATMENT CATALYST
2 Claims, 3 Drawing Figs.

[52] U.S. Cl. ................................................ 60/30, 23/288
[51] Int. Cl. .................................................... F01n 3/14
[50] Field of Search .......................................... 60/29, 30; 23/288.8, 288.3 F

[56] References Cited
UNITED STATES PATENTS

| 1,472,281 | 10/1923 | Page .......................... | 23/288.8 |
| 2,406,640 | 8/1946 | Siecke ........................ | 23/288.8 |
| 2,443,423 | 6/1948 | Helmers ..................... | 23/288.8 |
| 3,142,150 | 7/1964 | Pearlman ................... | 60/29 |
| 3,180,083 | 4/1965 | Heller ........................ | 60/29 |

FOREIGN PATENTS

| 21,551 | 8/1929 | Australia ..................... | 23/288.8 |

Primary Examiner—Douglas Hart
Attorneys—George L. Church, Donald R. Johnson, Wilmer E. McCorquodale, Jr. and Warren L. Soffian ABSTRACT: Apparatus for rapidly and uniformly heating nonconductive particulate material, especially exhaust treatment catalyst particles, which comprises dispersing conductive metal particles within the nonconductive material and subsequently inducing radio frequency current into the metal particles.

PATENTED JUN 1 1971 3,581,489

INVENTORS
DAVID L. CAMIN
ROBERT E. BURTNER
BY George L. Church
ATTORNEY

APPARATUS FOR INDUCTIVE HEATING NONCONDUCTIVE EXHAUST TREATMENT CATALYST

This invention relates to an apparatus and method for heating nonconductive particulate material and, more particularly, to the rapid uniform heating of a catalyst bed.

An important variable in the efficiency of catalytic chemistry is the temperature of the catalyst prior to its contact with reactants. In conjunction therewith is the necessity to reach reaction temperatures in a relatively short period of time and the ability to maintain uniform temperatures throughout a catalyst bed. These characteristics of catalyst efficiency are of extreme significance in the petroleum industry where most reactions take place at relatively high temperatures under strict control. If large temperature gradients are created between the outer and inner cores of a catalyst bed, or if a long heatup period is required, poor economic results can be expected.

Rapid, uniform heating of a catalyst bed has also been found necessary in the catalytic treatment of exhaust gases of internal combustion engines. It has been found that during the initial starting period of an internal combustion engine wherein a catalyst is to be employed for treating noxious fumes, the catalytic reaction does not begin until the temperature has been raised to an operative level. Accordingly, since pollutant emissions begin immediately, any delay in the catalytic reaction is defeating the overall purpose of the apparatus and treatment. Similar conditions also exist if during the operation of the internal combustion engine, the temperature falls below that at which the catalytic oxidation takes place.

Heretofore, many varied procedures have been employed to heat catalysts rapidly and uniformly up to reaction levels; and although some degree of success has been obtained, generally the processes have not proved favorable. Examples of the various techniques include the passing of steam or hot inert gases through the catalyst and subjecting the catalyst to a pretreatment reaction, both of which have proved to be uneconomical, and surrounding the catalyst bed with conductive heating coils which necessitate a long heatup period and create temperature gradients throughout the bed.

It is therefore the overall object of this invention to provide an apparatus and a method for rapidly and uniformly heating solid nonconductive particulate material.

It is a further object of the invention to provide rapid and uniform heating of a catalyst bed.

Other objects and advantages of the invention will become apparent from the following description and accompanying drawings in which.

In accordance with the objects of the invention, it has been discovered that the desired heating of nonconductive particulate material can be obtained by dispersing conductive metal particles in the nonconductive particles and subsequently inducing high frequency current into the metal particles from a radio frequency (R.F.) power source. A radio frequency power source is usually and herein defined as a source which generates alternating current into frequencies above 10,000 cycles per second. By this method, current induces into the metal because it is located in a strong alternating magnetic field circulates against the resistance of the material, and uniform heat is rapidly produced in the dispersion according to Ohm's Law. The invention finds use in any system where it is desired to heat such particles, such as a reaction column, filter medium, automobile exhaust system, etc.

As a general mode of operation, a radio frequency generator is activated and the high frequency current therefrom is passed to inducing means surrounding the dispersion of conductive and nonconductive catalyst particles. The inducing means can be in the form of a coil, an oven, or any other high frequency current inducing means well known in the art. Current is induced into the conductive particles, which in turn conduct the heat to the intimately contacted catalyst bed. No limitation is to be placed on the type of solid, nonconductive, particulate material subject to this mode of heating; however, catalysts such as silicates, crystalline alumino-silicates, molecular sieves, activated clay, sodalites, etc., are advantageously deployed. Similarly, no limitation is placed on the metallic particles present except that they be heat conductive. Examples of good conductors are iron, magnesium, aluminum, copper, etc. Generally, the presence of at least 5 percent by weight of the metal is sufficient for purposes of the invention, although preferably at least 10 percent by weight is present. However, it should be noted that no limitation is to be placed on the amount of metal present since this quantity may vary depending upon the metal itself, the dimensions of the housing, the uniformity of temperature desired, etc.

Figure 1:
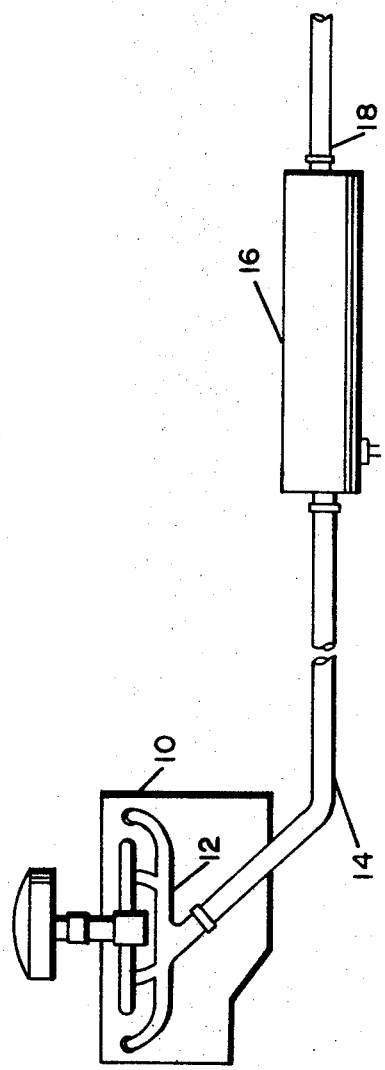
FIG. 1 is a side elevation view illustrating an internal combustion engine and particularly illustrating the exhaust system which embodies the present invention.

To more fully understand the organization and operation of the invention, reference should be made to the accompanying drawings showing the application of the apparatus in an automobile exhaust system, it being fully understood that no limitation is to be drawn thereto. Referring to the drawings, FIG. 1 shows a convention internal combustion engine 10 provided with an exhaust manifold 12 from which engine exhaust gases pass into an exhaust pipe 14. The pipe 14 leads to an entrance end of an exhaust gas-treating device 16. The gas-treating device may include therein an acoustic muffler, or if so desired a muffler may be placed downstream from the gas-treating device. Treated gas is discharged from device 16 through a conduit 18 connected thereto, said conduit 18 may be the tail pipe of an automobile.

Figure 3:
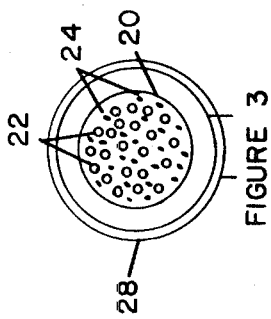
FIG. 3 is a view along line 3—3.
Figure 2:
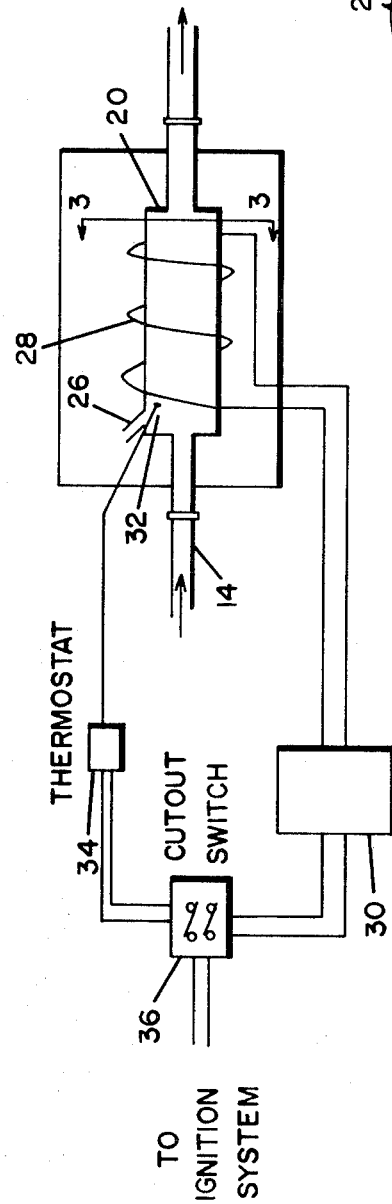
FIG. 2 is a side view of a gas-treating device as incorporated in an internal combustion engine and embodying the present invention.

The exhaust gas-treating device 16 encompassing the novel features of this invention is shown more particularly in FIGS. 2 and 3. As there shown, the device 16 consists of a housing 20, preferably composed of a nonconducting material, having situated therein an intimate particulate mixture of catalyst 22 and conducting metal 24. Exhaust gases from the engine and air enter the reactor through conduits 14 and 26, respectively. It should be noted that the mode of obtaining air for the reaction is merely shown in representative form, and any means or method of supplying air to such a device which is well known in the art is operable and herein contemplated. An example of such air supply means can be found in U.S. Pat. No. 3,385,053.

The catalyst is raised to its operative temperature level by subjecting it to heat generated by passing a high frequency current through inducing means 28, herein depicted in the form of a coil. The high frequency current in the inducer 28 is produced through the activation of a radiofrequency generator 30 by the ignition system (not shown). Also shown is a temperature control system comprising a temperature sensor 32, a thermostat 34, and a circuit cutout switch 36. The transducing thermostat 34 is set so that when the temperature sensor 32 is below the operative predetermined temperature, the circuit cutout switch 36 will be closed, allowing for the activation of the high frequency generator; and when the temperature reaches a point such that the catalysis is self-sustaining, the circuit will be opened.

The system illustrated herein operates in the following manner:

Upon startup of the internal combustion engine 10, the temperature sensor 32 is activated and senses that the catalytic material is below the operating temperature. The sensor 32, in conjunction with the thermostat 34, then closes the circuit cutout switch 36, allowing for the passage of the high frequency current to the inducer 28. After ignition, the engine exhaust gases pass through the exhaust pipe 14 and into the exhaust gas-treating device 16, and specifically, the catalytic reactor housing 20. Within the housing 20 the exhaust gases come in contact with oxygen and the heated catalyst to effect the oxidation of unburnt hydrocarbon gases to produce carbon dioxide. The catalyst system is also effective for removal of the nitrogen oxides present in the exhaust system. When the reaction becomes self-sustaining, the switch 36 is opened and the inductive heating is stopped.

We claim:

1. An apparatus for eliminating noxious fumes from the exhaust of an internal combustion engine during the initial starting period comprising;
   a. a housing having situated therein an intimate mixture of particulate nonconductive catalytic material and conductive metal particles,
   b. conduit means connected to said housing for introducing therein engine exhaust gases,
   c. means connected to said housing for introduction of air therein for reaction with said exhaust gases,
   d. inductive heating means surrounding said housing for inducing high frequency current into the metal particles,
   e. a radio frequency power source connected to said inducer for supplying high frequency current above 10,000 cycles per second to the inducer,
   f. means connected to said radio frequency power source for activation thereof,
   g. conduit means connected to said housing for discharge of the cleaned exhaust gases and
   h. temperature-sensing means located in said housing for detecting a predetermined temperature and means connected between said radio frequency power source and activation means for interrupting current therebetween in response to said sensing means.

2. Apparatus as described in claim 1 wherein said inducing means is a coil.